US010444356B2

(12) United States Patent
Wu et al.

(10) Patent No.: US 10,444,356 B2
(45) Date of Patent: Oct. 15, 2019

(54) LIDAR SYSTEM AND METHOD

(71) Applicant: Hesai Photonics Technology Co., Ltd., Shanghai (CN)

(72) Inventors: Shixiang Wu, Shanghai (CN); Liangchen Ye, Shanghai (CN); Rui Wang, Shanghai (CN); Shaoqing Xiang, Shanghai (CN); Yifan Li, Shanghai (CN)

(73) Assignee: Hesai Photonics Technology Co., Ltd., Shanghai (CN)

(*) Notice: Subject to any disclaimer, the term of this patent is extended or adjusted under 35 U.S.C. 154(b) by 0 days.

(21) Appl. No.: 16/161,694

(22) Filed: Oct. 16, 2018

(65) Prior Publication Data

US 2019/0113622 A1  Apr. 18, 2019

(30) Foreign Application Priority Data

Oct. 16, 2017 (CN) .................. 2017 2 1325350 U
Dec. 8, 2017 (CN) ...................... 2017 1 1312298

(51) Int. Cl.
| G01C 3/08 | (2006.01) |
| G01S 17/06 | (2006.01) |
| G02B 27/28 | (2006.01) |
| G02B 5/20 | (2006.01) |

(Continued)

(52) U.S. Cl.
CPC .............. G01S 17/06 (2013.01); G02B 5/20 (2013.01); G02B 26/10 (2013.01); G02B 27/283 (2013.01); G02B 27/30 (2013.01)

(58) Field of Classification Search
CPC ....... G01S 17/06; G02B 27/283; G02B 27/30; G02B 5/20; G02B 26/10

(Continued)

(56) References Cited

U.S. PATENT DOCUMENTS 9,810,775 B1* 11/2017 Welford ................ G01S 7/4814
2012/0187283 A1* 7/2012 Yamada ................ G01S 17/936
250/234

(Continued)

FOREIGN PATENT DOCUMENTS

CN     1847881 A    10/2006
CN     101813779 A   8/2010

(Continued)

OTHER PUBLICATIONS

Abhishek Kasturi et al., "UAV-Borne LiDAR with MEMS Mirror Based Scanning Capability", SPIE Defense and Commercial Sensing Conference 2016, Apr. 20, 2016, Baltimore, MD (10 pages).

(Continued)

Primary Examiner — Mark Hellner
(74) Attorney, Agent, or Firm — Sheppard Mullin Richter & Hampton LLP (57) ABSTRACT

A Lidar system may comprise: a laser configured to emit a laser beam; a reflector configured to receive the emitted laser beam and allow at least a portion of the emitted laser beam to transmit through the reflector, the at least the portion of the emitted laser beam being detection light; a two-dimensional scanning galvanometer; and a detector. The two-dimensional scanning galvanometer is configured to reflect the detection light to scan across an environment, receive at least a portion of the detection light reflected by a target in the environment, the at least the portion of the detection light reflected by the target being receiving light, and reflect the receiving light towards the reflector. The reflector is further configured to reflect the receiving light towards the detector. The detector is configured to measure the receiving light to detect the target.

20 Claims, 6 Drawing Sheets

(51) Int. Cl.
*G02B 26/10* (2006.01)
*G02B 27/30* (2006.01)

(58) Field of Classification Search
USPC .......................................................... 356/5.01
See application file for complete search history.

(56) References Cited

U.S. PATENT DOCUMENTS

2014/0078489 A1    3/2014  Hoashi
2017/0155225 A1*   6/2017  Villeneuve .............. G01S 17/00

FOREIGN PATENT DOCUMENTS

| | | |
|---|---|---|
| CN | 203870253 U | 10/2014 |
| CN | 106443635 A | 2/2017 |
| CN | 107167787 A | 9/2017 |
| CN | 107272014 A | 10/2017 |
| CN | 107356930 A | 11/2017 |
| CN | 207037085 U | 2/2018 |
| JP | 4-57983 B2 | 9/1992 |
| JP | 2013-210316 A | 10/2013 |
| JP | 2015-132768 A | 7/2015 |

OTHER PUBLICATIONS

First Search dated Jul. 17, 2019, issued in related Chinese Application No. 201711312298.X (2 pages).
First Office Action dated Jul. 25, 2019, issued in related Chinese Application No. 201711312298.X, with English machine translation (17 pages).

* cited by examiner

LIDAR SYSTEM AND METHOD

CROSS REFERENCE TO RELATED APPLICATIONS

The present application is based on and claims priority to the Chinese Application No. 201721325350.0, filed Oct. 16, 2017, and the Chinese Application No. 201711312298.X, filed Dec. 8, 2017, the entire contents of all of the above applications are incorporated herein by reference.

TECHNICAL FIELD

The present invention relates to the field of semiconductor technologies, and in particular, to Lidar (light detection and ranging) systems and target detection methods.

BACKGROUND

Lidar systems have important applications in an unmanned driving system, for the capability of detecting obstacles in front of the vehicle and providing distance information of the obstacles. Lidar systems often require a high imaging frame frequency, high resolution, long distance measuring capability, small size, high reliability, and low cost.

An exemplary Lidar system may comprise a laser emission system and a detection system. The emitted laser beam by the Lidar system is reflected after encountering a target and is received by the detection system, and the distance of the corresponding target point on the target can be measured based on the laser round-trip time (e.g., by the time flying method). When a whole target area is scanned, three-dimensional imaging of the scanned area can be realized.

Each Lidar system can be classified as a non-coaxial system or a coaxial system, according to whether the optical axes of the emitting optical path and the receiving optical path overlap. In order to ensure that the emitted laser beams all enter the Lidar's receiving field of view after passing through the Lidar blind zone and the transition zone, the emitted laser beams are required to be parallel to the optical axis of the receiving telescope. If the direction of the emitted light beam changes, the Lidar overlap factor correction curve becomes indefinite, and the correct correction results cannot be obtained for the overlap region. When the deviation is so significant that the laser beam deviates from the receiving field of view, the Lidar may fail to detect targets.

In existing Lidar systems, non-coaxial Lidar systems cannot ensure the emitted light beam to be coaxial or parallel to the optical axis of the receiving telescope, due to the deflection of the mirrors, the operating temperature of the semiconductor laser, the vibration of the stage, the replacement wavelength, and the service life of the semiconductor laser. Also, the existing Lidar systems use a one-dimensional rotation of the galvanometer to achieve spatial scanning, which cannot scan an area field of view.

SUMMARY

According to one aspect, a Lidar system may comprise: a laser configured to emit a laser beam; a reflector configured to receive the emitted laser beam and allow at least a portion of the emitted laser beam to transmit through the reflector, the at least the portion of the emitted laser beam being detection light; a two-dimensional scanning galvanometer configured to reflect the detection light to scan across an environment; and a detector configured to receive at least a portion of the detection light reflected by a target in the environment. The two-dimensional scanning galvanometer is further configured to receive at least the portion of the detection light reflected by the target in the environment, the at least the portion of the detection light reflected by the target being receiving light, and reflect the receiving light towards the reflector. The reflector is further configured to reflect the receiving light towards the detector. The detector is configured to measure the receiving light to detect the target.

According to another aspect, a target detection method may comprise: emitting a laser beam from a laser; receiving the emitted laser beam by a reflector to allow at least a portion of the emitted laser beam to transmit through the reflector, the at least the portion of the emitted laser beam being detection light; reflecting the detection light by a two-dimensional scanning galvanometer to scan across an environment; receiving at least a portion of the detection light reflected by a target in the environment, the at least the portion of the detection light reflected by the target being receiving light; reflecting the receiving light by the two-dimensional scanning galvanometer towards the reflector; reflecting the receiving light by the reflector towards a detector; and measuring the receiving light by the detector to detect the target.

According to another aspect, a Lidar system, comprising: a laser configured to emit a laser beam; an open-hole reflector configured to receive the emitted laser beam and allow the emitted laser beam to transmit through the open-hole reflector via a through hole, the emitted laser beam transmitted through being detection light; a two-dimensional scanning galvanometer; and a detector. The two-dimensional scanning galvanometer is configured to: reflect the detection light to scan across an environment, receive at least a portion of the detection light reflected by a target in the environment, the at least the portion of the detection light reflected by the target being receiving light, and reflect the receiving light towards the open-hole reflector. The open-hole reflector is further configured to reflect the receiving light towards the detector. The detector is configured to measure the receiving light to detect the target.

DETAILED DESCRIPTION

Current Lidar systems use motors to drive scanning reflectors or optical machine systems to achieve field scanning. For example, vertical direction scanning is realized through pitching swing of the scanning mirror, and horizontal direction scanning is realized through rotating the scanning mirror and the optical system by the motor. In this case, a stepping motor or a brushless motor is used for driving the scanning mirror and the optical system, and the scanning frequency is limited by the rotating speed of the motor (the rotating speed of the motor is usually only several thousand revolutions per minute), which cannot provide high frame frequency imaging as required for the unmanned driving application. In another example, vertical direction scanning is realized by arranging a plurality of lasers and detectors in the vertical direction, and horizontal direction scanning is realized through rotating the emission and receiving system by the motor. However, such system is complex in structure and large in size, costly and unreliable, and untenable for large-scale production.

Further, existing non-coaxial Lidar systems cannot ensure the emitted light beam to be coaxial or parallel to the optical axis of the receiving telescope, due to the deflection of the mirrors, the operating temperature of the semiconductor laser, the vibration of the stage, the replacement wavelength, and the service life of the semiconductor laser. Also, the existing Lidar systems use a one-dimensional rotating galvanometer to achieve spatial scanning, which cannot scan an area field of view.

Various embodiments of Lidar systems and target detection methods are described below to at least mitigate the above-described deficiencies of the existing Lidar technologies. In some embodiments, a Lidar system comprises an emitting module, a collimating module, a light splitting module, and a scanning module that are located on the same optical path. The disclosed Lidar system can keep the emitting light path and the receiving light path coaxial or parallel. Meanwhile, the control module can control the scanning module's actuation to reflect the parallel laser beams transmitted by the light splitting module to a two-dimensional space, and to reflect the signals of the laser beams reflected by target(s) in the two-dimensional space to the light splitting module. Thus, high-precision scanning of a two-dimensional space can be realized.

In various embodiments described below with reference to FIG. 1 to FIG. 4, a Lidar system may comprise: a laser configured to emit a laser beam; a reflector configured to receive the emitted laser beam and allow at least a portion of the emitted laser beam to transmit through the reflector, the at least the portion of the emitted laser beam being detection light; a two-dimensional scanning galvanometer configured to reflect the detection light to scan across an environment; and a detector configured to receive at least a portion of the detection light reflected by a target in the environment. The two-dimensional scanning galvanometer is further configured to receive at least the portion of the detection light reflected by the target in the environment, the at least the portion of the detection light reflected by the target being receiving light, and reflect the receiving light towards the reflector. The reflector is further configured to reflect the receiving light towards the detector. The detector is configured to measure the receiving light to detect the target. The detection light and the receiving light are substantially coaxial. The emitted laser beam may be collimated by a collimator to the reflector. The laser, the collimator, the reflector, and the two-dimensional scanning galvanometer are substantially coaxial.

Figure 1:
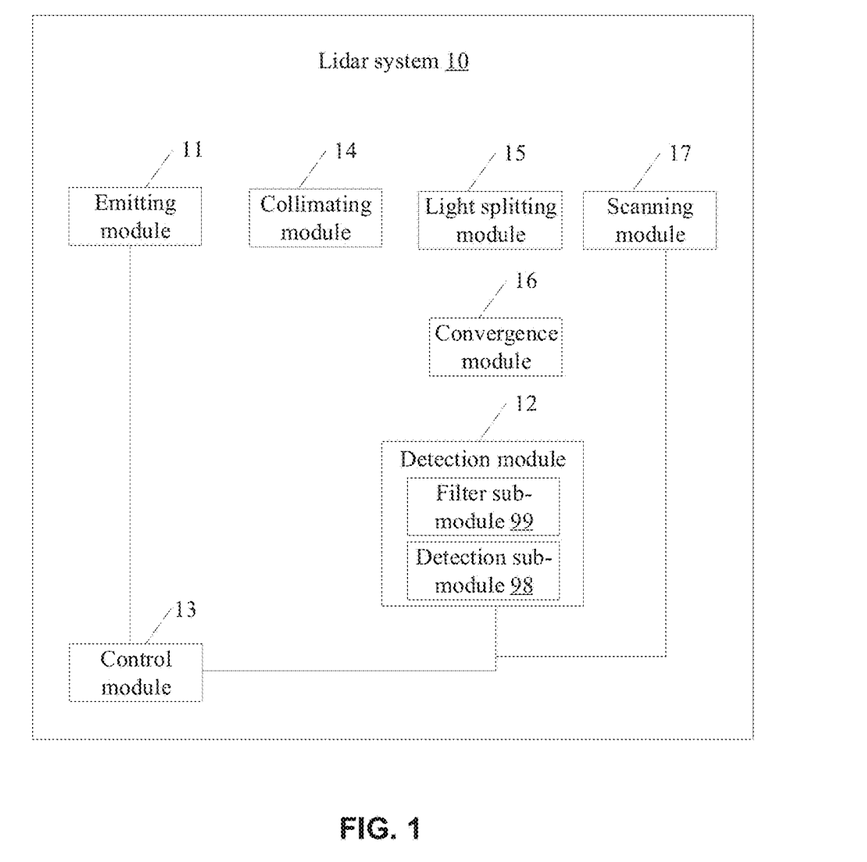
FIG. 1 illustrates a schematic block diagram of a Lidar system, consistent with various embodiments of the present disclosure.

FIG. 1 illustrates a schematic block diagram of a Lidar system 10, consistent with various embodiments of the present disclosure. In some embodiments, the Lidar system 10 may comprise an emitting module 11, a detection module 12, a control module 13, a collimating module 14, a light splitting module 15 (which may also be referred to as a reflector), a convergence module 16, and a scanning module 17. The control module 13 is coupled to the emitting module 11, the detection module 12, and the scanning module 17. The control module 13 is configured to control the emitting module 11 to generate and emit laser beams, control the scanning module 17 to actuate, and control the detection module 12 to receive and process reflection signals of laser beams (e.g., the controller may control a detector of the detection module 12 to filter light other than the emitted laser beam's wavelength to measure the receiving light). The emitting module 11, the collimating module 14, the light splitting module 15, and the scanning module 17 are located on the same optical path.

In some embodiments, the emitting module 11 is configured to generate and emit laser beams under the control of the control module 13. In this disclosure, the laser beams may also be referred to as laser pulses, laser signals, or other names. That is, the disclosed laser may emit laser beams or pulses in a similar fashion. The collimation module 14 is configured to adjust the laser beams emitted by the emitting module 11 into parallel laser beams. The light splitting module 15 is configured to transmit parallel laser beams that are adjusted by the collimating module 14 (when directing detection light out of the Lidar), and reflect a reflection signal of a laser beam reflected by the scanning module 17 (when directing receiving light to a detector of the Lidar). The scanning module 17 is configured to actuate (e.g., swing) under the control of the control module 13, reflect the parallel laser beams from the light splitting module 15 to a two-dimensional space (when directing detection light out of the Lidar), and reflect laser signals reflected by target(s) in the two-dimensional space to the light splitting module 15 (when directing receiving light to a detector of the Lidar). The convergence module 16 is configured to converge a laser signal reflected by the light splitting module 15, so as to be received by the detection module 12. The detection module 12 is configured to receive and process the reflected laser signals converged by the convergence module 16 to obtain information (e.g., distance information) of the target(s).

In some embodiments, the emitting module 11 may comprise a semiconductor laser, an optical fiber laser, or other kinds of lasers. Laser beams of different wavelengths can be emitted by different types of lasers in the emitting module 11. For example, when the emitting module 11 is a near-infrared semiconductor laser, near-infrared light can be generated and transmitted.

In some embodiments, the light splitting module 15 may comprise an open-hole reflector, a semi-transparent semi-reflecting mirror, a polarization beam splitter, and/or a coated beam splitter. The light splitting module 15 is configured to transmit the parallel laser beams that have been adjusted by the collimating module 14, and reflect laser signals reflected by the scanning module 17. In one example, the scanning module 17 may be a scanning mirror.

In some embodiments, the scanning module 17 comprises a two-dimensional galvanometer, and the control module 13 can control the scanning module 17 to freely move in the horizontal space and the vertical space, so that the scanning module 17 can reflect the parallel laser beams transmitted by the light splitting module 15 to a two-dimensional space. That is, the controller may actuate the two-dimensional scanning galvanometer to reflect the Lidar's detection light to scan across an environment. Further, for the receiving light, the scanning module 17 can reflect laser signals reflected by the target(s) in the two-dimensional space to the light splitting module 15. Thus, high-precision scanning of a horizontal and vertical two-dimensional space is achieved. In one example, the two-dimensional galvanometer can comprise an electrostatic galvanometer, an electromagnetic vibration mirror, a piezoelectric galvanometer, or an electric thermo-galvanometer.

In some embodiments, the collimating module 14 can comprise one or more lenses. Through the collimating lens, the laser beams emitted by the emitting module 11 can be adjusted (e.g., collimated) into parallel laser beams to facilitate transmission through the light splitting module 15.

In some embodiments, the convergence module 16 can comprise one or more lenses. The laser signal reflected by the light splitting module 15 can be converged through a convergent lens to be received by the detection module 12.

In some embodiments, to avoid interference between different Lidar systems, the emitting module 11 can be configured to emit laser beams of a determined wavelength or wavelength range, so that the detection module 12 only receives a corresponding reflection signal of the laser beams emitted by the emitting module 11 at the corresponding wavelength or wavelength range. For example, the controller may control the detector to filter light other than the emitted laser beam's wavelength to measure the receiving light. The emitting module 11 may be controlled by the control module 13 to generate a laser beam of a preset wavelength. The detection module 12 may comprise a filter sub-module 99 configured to filter out light signals other than with the preset wavelength. For example, the filter sub-module 99 may comprise a wavelength tunable filter or a narrow-band filter. The detection module 12 may also comprise a detection sub-module 98 configured to receive and process received light signals at the preset wavelength. For example, the detection sub-module 98 may comprise a photoelectric sensor. The photoelectric sensor may be a PIN photoelectric sensor, an Avalanche Photodiode (APD) sensor, or a Geiger-mode Avalanche Photodiode (GM-APD).

In some embodiments, when applying the disclosed Lidar system, the emitting module 11, the collimating module 14, the light splitting module 15, and the scanning module 17 can be arranged on the same optical path, and the transmitting light path and the receiving light path can be kept to coaxial or parallel. Meanwhile, the scanning module 17 can be controlled to actuate. The parallel laser beams transmitted by the light splitting module 15 can radiate towards the two-dimensional space. The scanning module 17 can reflect laser signals reflected by the objects in the two-dimensional space to the light splitting module 15. Thus, high-precision scanning in horizontal and vertical directions of a two-dimensional space can be achieved. In addition, the Lidar system is compact in structure, highly integrated, and stable. The service life of the Lidar system can be improved.

Figure 2:
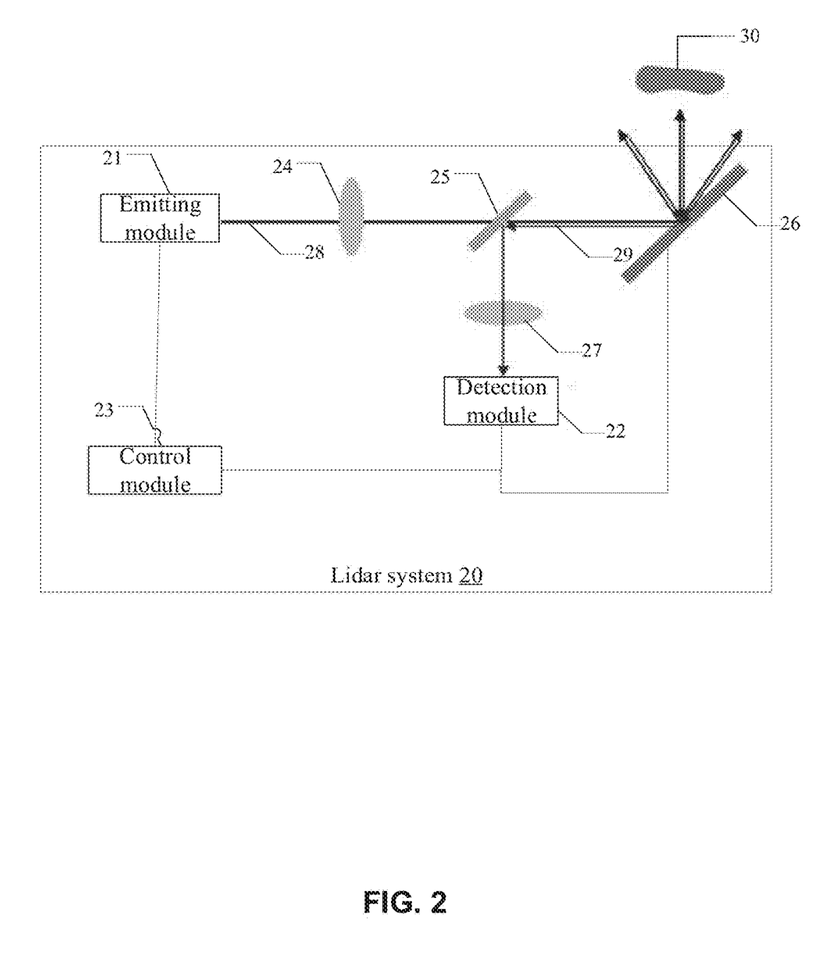
FIG. 2 illustrates a schematic structural diagram of a Lidar system, consistent with various embodiments of the present disclosure.

FIG. 2 illustrates a schematic structural diagram of a Lidar system 20, consistent with various embodiments of the present disclosure. Referring to FIG. 2, the Lidar system 20 may comprise an emitting module 21 (corresponding to the emitting module 11) and a collimating lens 24 (corresponding to the collimating module 14), a light splitting module 25 (corresponding to the light splitting module 15), a two-dimensional galvanometer 26 (corresponding to the scanning module 17), a detection module 22 (corresponding to the detection module 12), a control module 23 (corresponding to the control module 13 and may also be referred to as a controller), and a convergent lens 27 (corresponding to the convergence module 16). All of the optical components other than the convergent lens 27 may locate on the same optical path.

In some embodiments, the emitting module 21 is controlled by the control module 23 to generate and emit laser beam 28. The laser beam 28 is collimated by the collimating lens 24 to form parallel laser beams 28, which passes through the light splitting module 25 to reach the two-dimensional galvanometer 26. The two-dimensional galvanometer 26 as controlled by the control module 23 actuates to reflect the laser beam 28 and to scan a two-dimensional space in an environment. When a target object 30 in the two-dimensional space reflects the laser beam 28 as the reflected signal 29 back to the two-dimensional galvanometer 26, the two-dimensional galvanometer 26 reflects the reflected signal 29 to the light splitting module 25. The light splitting module 25 reflects the reflected signal 29 to the convergent lens 27 to converge to the detection module 22. The detection module 22 is controlled by the control module 23 to receive and process the reflected signal 29.

In some embodiments, when the emitting module 21 emits laser beam 28 at the preset wavelength $\lambda_1$, the detection module 22 can filter incoming signals through a wavelength modulation filter or a plurality of narrow-band optical filter lasers to remove light signals at wavelengths other than $\lambda_1$. Thus, the distance information of the target object 30 can be accurately calculated based on the reflection signal at the wavelength of $\lambda_1$, and interference from other Lidars (at different wavelengths) can be effectively suppressed.

Figure 3:
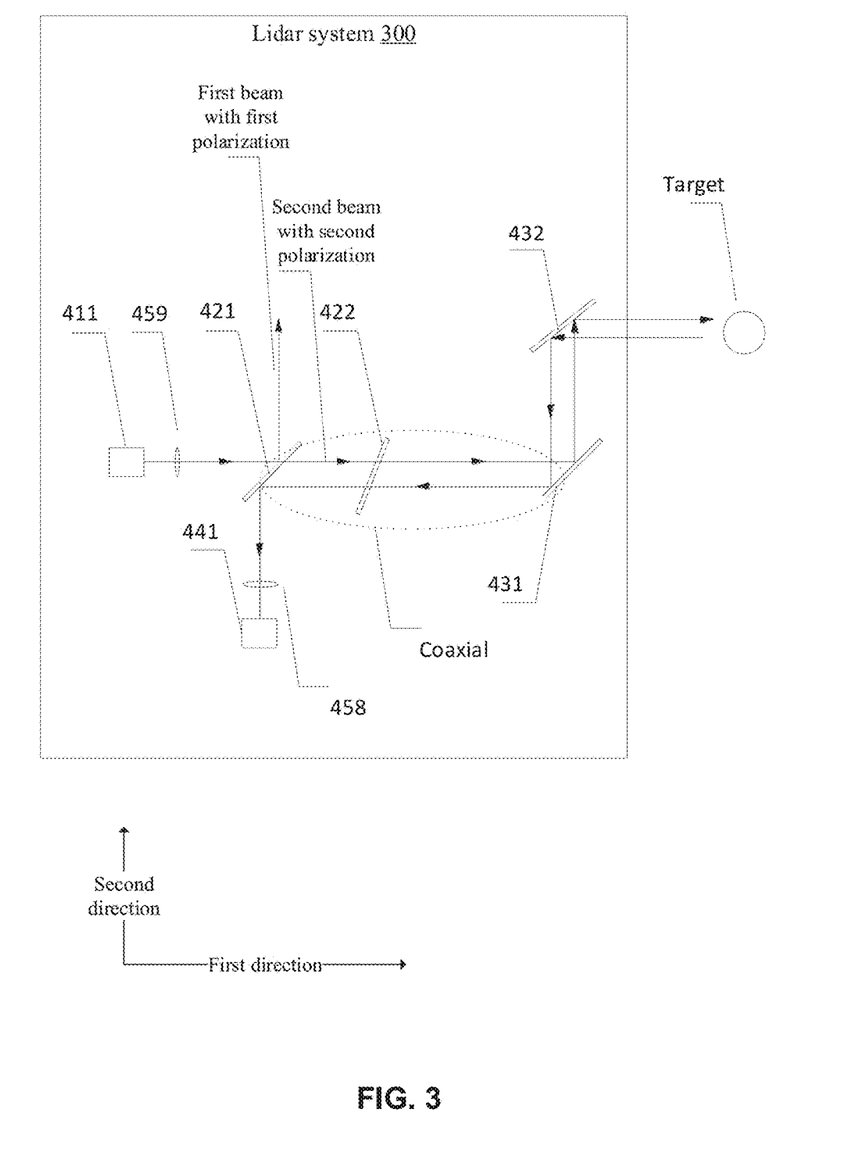
FIG. 3 illustrates a schematic structural diagram of a Lidar system, consistent with various embodiments of the present disclosure.

FIG. 3 illustrates a schematic structural diagram of a Lidar system 300, consistent with various embodiments of the present disclosure. In some embodiments, the Lidar system 300 may be based on a two-dimensional scanning module. As shown in FIG. 3, the Lidar system 300 may comprise: a laser 411 (e.g., a pulsed laser with an output wavelength of 1550 nm), a collimating lens 459 (e.g., a single lens or a lens group), a light reflection unit, a two-dimensional scanning module, and a detector 441.

In some embodiments, the light reflection unit may comprise: a polarization beam splitter 421 and a quarter-wave plate 422. In some embodiments, the laser 411 may emit a laser beam that is collimated by the collimating lens 459 to the polarization beam splitter 421. The polarization beam splitter 421 splits the laser beam into: (1) a first polarized beam as reflected by the polarization beam splitter 421 (a first bean with a first polarization and propagating upwards in this figure), and (2) a second polarized beam as transmitted through the polarization beam splitter 421 (a second beam with a second polarization and propagating rightwards in this figure). For example, one of p-polarization and s-polarization is the first polarization, and the other polarization is the second polarization. That is, the polarization beam splitter is configured to receive the emitted laser beam propagating in a first direction and split the emitted laser beam into a first beam having a first polarization and a second beam having a second polarization. The first beam propagates in a second direction normal to the first direction. The second beam is the at least the portion of the emitted laser beam that transmits through the reflector and propagates in the first direction. The first polarization is s-polarization and the second polarization is p-polarization, or the first polarization is p-polarization and the second polarization is s-polarization.

In some embodiments, the Lidar system 300 may further comprise another reflector (not shown) configured to reflect the first polarized beam to a light absorber (not shown), and the light absorber is configured to absorb the first polarized beam.

From the polarization beam splitter 421, the second polarized beam reaches and passes through the quarter-wave plate 422 and then is converted into circularly polarized beam. The second beam from the reflector 421 till reaching a target may be referred to as the detection light.

In some embodiments, the two-dimensional scanning module comprises: a first scanning module 431 configured to rotate around a first rotating shaft, and a second scanning module 432 configured to rotate around a second rotating shaft. An angle between the first rotating shaft and the second rotating shaft is an acute angle or a right angle. In some embodiments, the circularly polarized beam is reflected by the first scanning module 431 and the second scanning module 432 sequentially before exiting the Lidar, and then scanning an environment. After exiting the Lidar system, the circularly polarized beam may reach a target object and be reflected by the target object. The target-reflected circularly polarized beam may reenter the Lidar system and be reflected by the second scanning module 432 and the first scanning module 431 sequentially, and then pass through the quarter-wave plate 422 to be converted into a beam of the first polarization, which is then reflected towards the convergent lens 458 by the polarization beam splitter 421. The target-reflected beam may be referred to as receiving light. The convergent lens 458 is configured to converge beam reflected by the polarization beam splitter to the detector 441 (e.g., single-point APD (avalanche photo-diode) detector). That is, the detection light and the receiving light pass through the quarter-wave plate in opposite directions. The quarter-wave plate is configured to receive the second beam as the detection light and polarize the detection light into circularly polarized light before reaching the two-dimensional scanning module. The quarter-wave plate is further configured to polarize the receiving light, coming from the two-dimensional scanning module and before reaching the reflector, to have the first polarization. The polarization beam splitter 421 is configured to reflect the receiving light from the quarter-wave plate having the first polarization to the detector 441. As shown, the receiving light incident on the polarization beam splitter 421 and the detection light may be coaxial.

In various embodiments, the emitted light from the laser 411 is collimated by the collimating lens 459 and then enters the polarization beam splitter 421 and is split into the first beam having the first polarization and the second beam having the second polarization. The second beam passes through the quarter-wave plate 422 to be converted into circularly polarized light. The circularly polarized light is reflected by the first scanning module 431 and the second scanning module 432 in sequence. The first scanning module 431 and the second scanning module 432 can respectively perform field scanning in the horizontal direction and the vertical direction. The circularly polarized light when reflected by a target object to reenter the Lidar (the reflected light is also circularly polarized) is sequentially reflected by the second scanning module 432 and the first scanning module 431 and then passes through the quarter-wave plate 422, which converts it to have the first polarization and is then reflected by the polarization beam splitter 421 to the detector 441. The output signal of the detector 441 can be sent to an analysis device. For example, the analysis device may comprise a processor configured to determine the distance from the Lidar system to the target based at least in part on a round-trip time of flight for the emitted beam to travel from the Lidar system to the target and back to the Lidar system.

Figure 4:
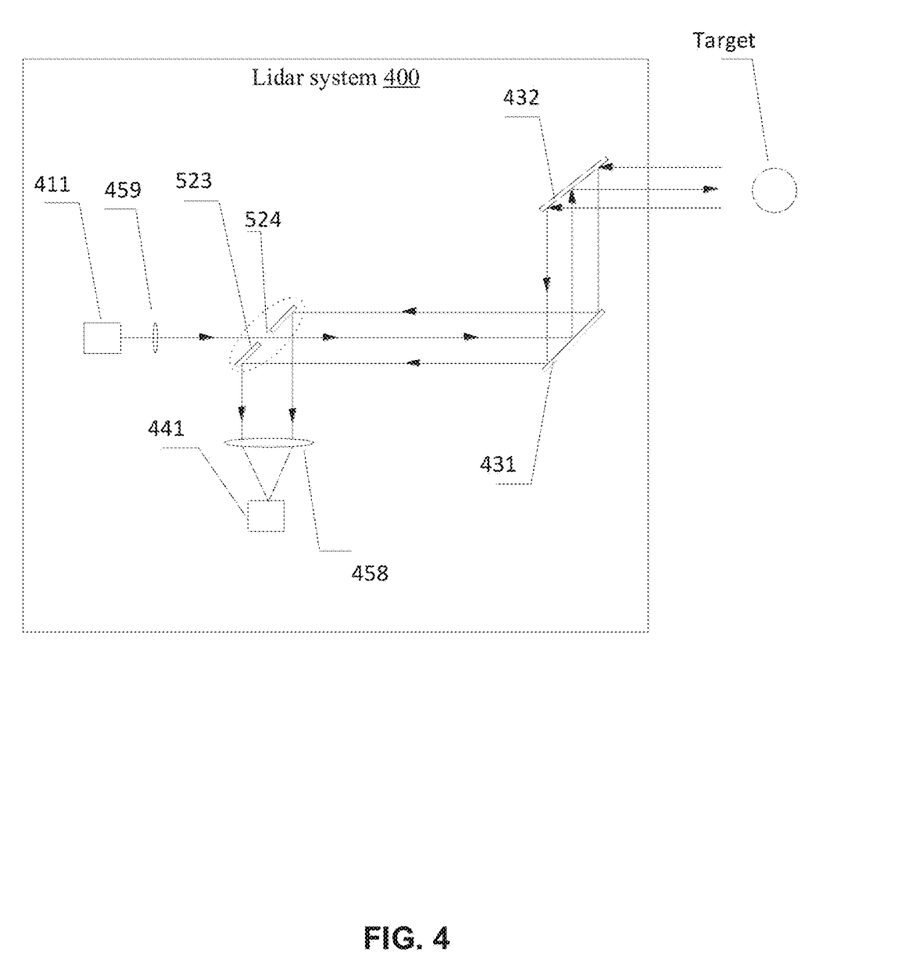
FIG. 4 illustrates a schematic structural diagram of a Lidar system, consistent with various embodiments of the present disclosure.

FIG. 4 illustrates a schematic structural diagram of a Lidar system 400, consistent with various embodiments of the present disclosure. In some embodiments, the Lidar system 400 is based on the two-dimensional scanning module. The Lidar system 400 may comprise several similar components as the Lidar system 300. The Lidar system 400 may comprise a laser 411 (e.g., a pulsed laser with an output detection light wavelength of 1550 nm), a collimating lens 459 (e.g., a single lens or a lens group), a light reflection unit, a two-dimensional scanning module, and a detector 441.

In some embodiments, the light reflection unit may comprise a reflector 523. The center of the reflector 523 is provided with a through hole 524, and the detection light passes through the through hole 524. For example, the open-hole reflector comprises a through hole 524 penetrating from a first surface of the reflector to a second surface of the reflector for allowing the at least the portion of the emitted laser beam impinging on the first surface to transmit through the reflector by exiting from the second surface. When a target reflects light back, the reflector 523 also reflects the receiving light by the second surface of the reflector towards the detector 441. That is, to reflect the receiving light towards the detector, the second surface is configured to reflect the receiving light towards the detector.

In some embodiments, the two-dimensional scanning module comprises: a first scanning module 431 configured to rotate around a first rotating shaft, and a second scanning module 432 configured to rotate around a second rotating shaft. An angle between the first rotating shaft and the second rotating shaft is an acute angle or a right angle. The first and second scanning modules may each comprise a mirror or an alternative optical component for redirecting light path. The detection light (the laser light through the hole 524) is sequentially reflected by the first scanning module 431 and the second scanning module 432, projects to an environment. The laser beam may be reflected by a target. The target-reflected light is sequentially reflected by the second scanning module 432 and the first scanning module 431, and is reflected by the reflector 523 to a convergent lens 458. As shown, the target-reflected light incident on the reflector 523 and the detection light may be coaxial.

The convergent lens 458 is configured to converge beam reflected by the reflector 523 to the detector 441 (e.g., single-point APD detector).

In various embodiments, emitted light from the laser 411 is collimated by the collimating lens 459 and then passes through the through hole 524 of the reflector 523. The detection light is reflected by the first scanning module 431 and the second scanning module 432 in sequence. The first scanning module 431 and the second scanning module 432 can respectively perform field scanning in the horizontal direction and the vertical direction. The scanning laser light when reflected by a target object to reenter the Lidar is sequentially reflected by the second scanning module 432 and the first scanning module 431 and then reflected by the reflector 523 and converged by the convergent lens 458 to the detector 441. The output signal of the detector 441 can be sent to an analysis device. For example, the analysis device may comprise a processor configured to determine the distance from the Lidar system to the target based at least in part on a round-trip time of flight for the emitted beam to travel from the Lidar system to the target and back to the Lidar system. That is, the two-dimensional scanning module comprises a rotatable first scanning module and a rotatable second scanning module. The detection light is reflected by the first scanning module and the second scanning module sequentially to scan the environment. The rotation of the first scanning module causes the detection light to scan in a horizontal direction. The rotation of the second scanning module causes the detection light to scan in a vertical direction. The receiving light is reflected by the second scanning module and the first scanning module sequentially.

Figure 5:
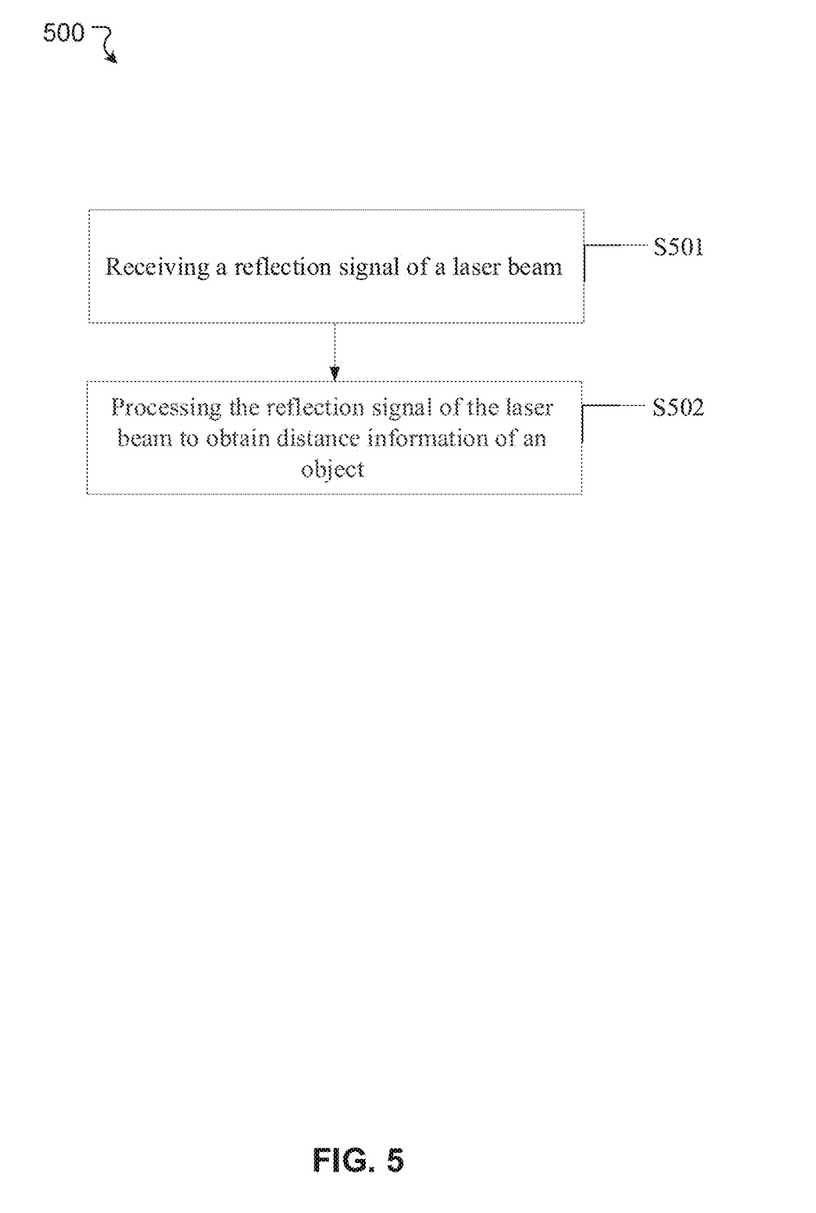
FIG. 5 illustrates a method for target detection, consistent with various embodiments of the present disclosure.

FIG. 5 illustrates a method 500 for target detection, consistent with various embodiments of the present disclosure. Referring to FIG. 5, the method 500 can include the following steps:

Step S501: receiving a reflection signal of a laser beam. In some embodiments, in order to avoid interference from other Lidar systems, a laser beam signal with a preset wavelength can be emitted by the emitting module, and the receiving laser beam signal can pass through the filtering sub-module, and the reflection signals different from the preset wavelength can be filtered out. For example, the filtering sub-module can be a wavelength tunable filter or a narrow-band filter. The preset wavelength of the emitted laser beam may be acquired by the control module.

Step S502: processing the reflection signal of the laser beam to obtain distance information of an object. In some embodiments, a delay time (between the light emission and detection) of the reflected signal of the laser beam can be used for calculating the distance information of the object.

Figure 6:
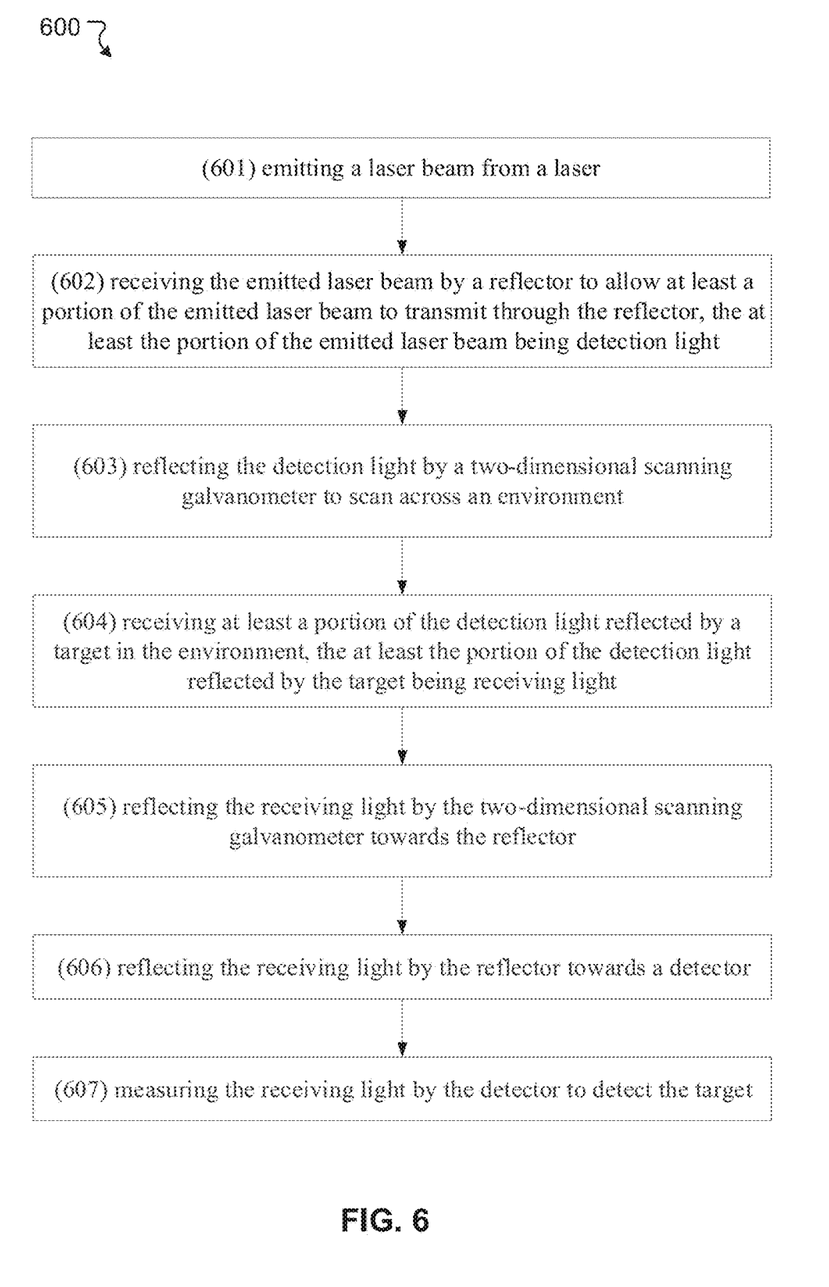
FIG. 6 illustrates a method for target detection, consistent with various embodiments of the present disclosure.

FIG. 6 illustrates a method 600 for target detection, consistent with various embodiments of the present disclosure. The method 600 may be implemented by various systems described herein. The operations of method 600 presented below are intended to be illustrative. Depending on the implementation, the exemplary method 600 may include additional, fewer, or alternative steps performed in various orders or in parallel.

The target detection method may comprise: (601) emitting a laser beam from a laser; (602) receiving the emitted laser beam by a reflector to allow at least a portion of the emitted laser beam to transmit through the reflector, the at least the portion of the emitted laser beam being detection light; (603) reflecting the detection light by a two-dimensional scanning module to scan across an environment; (604) receiving at least a portion of the detection light reflected by a target in the environment, the at least the portion of the detection light reflected by the target being receiving light; (605) reflecting the receiving light by the two-dimensional scanning module towards the reflector; (606) reflecting the receiving light by the reflector towards a detector; and (607) measuring the receiving light by the detector to detect the target. The step (602) of receiving the emitted laser beam by the reflector to allow at least the portion of the emitted laser beam to transmit through the reflector may comprise: receiving at the polarization beam splitter the emitted laser beam propagating in a first direction and splitting by the polarization beam splitter the emitted laser beam into a first beam having a first polarization and a second beam having a second polarization.

In some embodiments, the detection light and the receiving light pass through a quarter-wave plate in opposite directions. Between step (602) and step (603), the method 600 further comprises: (612) receiving the second beam by the quarter-wave plate as the detection light, and (622) polarizing the detection light by the quarter-wave plate into circularly polarized light before reaching the two-dimensional scanning module. Between step (605) and step (606), the method 600 further comprises: (615) polarizing the receiving light by the quarter-wave plate to have the first polarization, and (625) reflecting the receiving light from the quarter-wave plate by the polarization beam splitter to the detector Between step (601) and (602), the method 600 further comprises receiving the laser beam emitted from the laser by a collimator and collimate the laser beam by the collimator to the reflector.

The embodiments of the invention further provide a non-transitory computer readable storage medium storing instructions that, when executed by a processor coupled to the storage medium, causing the process to perform various steps and methods described herein.

The embodiments of the invention further provide a Lidar system comprising a memory and a processor, and a computer instructions which can run on the processor is stored on the memory, when the processor runs the computer instruction, the method 500 or 600 for target detection can be executed.

Persons of ordinary skill in the art can understand that all or part of the steps of the various methods of the embodiments can be completed by program instructing relevant hardware. The program can be stored in a computer readable storage medium. The storage medium can comprise a ROM, a RAM, a magnetic disk, an optical disk and the like.

What is claimed is:

1. A Lidar system, comprising:
a laser configured to emit a laser beam;
a reflector comprising a polarization beam splitter configured to receive the emitted laser beam propagating in a first direction and split the emitted laser beam into a first beam and a second beam, wherein the second beam is at least a portion of the emitted laser beam that transmits through the reflector and propagates in the first direction and is detection light;
a two-dimensional scanning module configured to reflect the detection light to scan across an environment; and
a detector configured to receive at least a portion of the detection light reflected by a target in the environment and then by the polarization beam splitter.

2. The Lidar system of claim 1, wherein:
the two-dimensional scanning module is further configured to:
receive at least the portion of the detection light reflected by the target in the environment, the at least the portion of the detection light reflected by the target being receiving light, and
reflect the receiving light towards the reflector;
the reflector is further configured to reflect the receiving light towards the detector; and
the detector is configured to measure the receiving light to detect the target.

3. The Lidar system of claim 2, wherein:
the polarization beam splitter is configured to receive the emitted laser beam propagating in the first direction and split the emitted laser beam into the first beam having a first polarization and the second beam having a second polarization;
the first beam propagates in a second direction normal to the first direction; and
the first polarization is s-polarization and the second polarization is p-polarization, or the first polarization is p-polarization and the second polarization is s-polarization.

4. The Lidar system of claim 3, further comprising a light absorber configured to absorb the first beam.

5. The Lidar system of claim 3, further comprising a quarter-wave plate, wherein:
the detection light and the receiving light pass through the quarter-wave plate in opposite directions;
the quarter-wave plate is configured to receive the second beam as the detection light and polarize the detection light into circularly polarized light before reaching the two-dimensional scanning module;

the quarter-wave plate is further configured to polarize the receiving light, coming from the two-dimensional scanning module and before reaching the reflector, to have the first polarization; and the polarization beam splitter in configured to reflect the receiving light from the quarter-wave plate having the first polarization to the detector.

6. The Lidar system of claim 1, wherein the detection light and the receiving light are substantially coaxial.

7. The Lidar system of claim 1, wherein:
the two-dimensional scanning module comprises a rotatable first scanning module and a rotatable second scanning module;
the detection light is reflected by the first scanning module and the second scanning module sequentially to scan the environment;
a rotation of the first scanning module causes the detection light to scan in a horizontal direction;
a rotation of the second scanning module causes the detection light to scan in a vertical direction; and
the receiving light is reflected by the second scanning module and the first scanning module sequentially.

8. The Lidar system of claim 1, further comprising a collimator configured to receive the laser beam emitted from the laser and collimate the laser beam to the reflector, wherein the laser, the collimator, the reflector, and the two-dimensional scanning module are substantially coaxial.

9. The Lidar system of claim 1, further comprising a controller coupled to the laser, the detector, and the two-dimensional scanning module, wherein the controller is configured to:
control the laser to emit the laser beam;
actuate the two-dimensional scanning module to reflect the detection light to scan across the environment; and
control the detector to filter light other than the emitted laser beam's wavelength to measure the receiving light.

10. A target detection method, comprising:
emitting a laser beam from a laser in a first direction;
receiving the emitted laser beam by a polarization beam splitter of a reflector to split the emitted laser beam into a first beam and a second beam, wherein the second beam is at least a portion of the emitted laser beam that transmits through the reflector and propagates in the first direction and is detection light;
reflecting the detection light by a two-dimensional scanning module to scan across an environment; and
receiving at least a portion of the detection light reflected by a target in the environment and then by the polarization beam splitter, the at least the portion of the detection light reflected by the target being receiving light.

11. The target detection method of claim 10, further comprising:
reflecting the receiving light by the two-dimensional scanning module towards the reflector;
reflecting the receiving light by the reflector towards a detector; and
measuring the receiving light by the detector to detect the target.

12. The target detection method of claim 11, wherein:
receiving the emitted laser beam by the reflector to allow at least the portion of the emitted laser beam to transmit through the reflector comprises receiving at the polarization beam splitter the emitted laser beam propagating in the first direction and splitting by the polarization beam splitter the emitted laser beam into the first beam having a first polarization and the second beam having a second polarization;
the first beam propagates in a second direction normal to the first direction; and
the first polarization is s-polarization and the second polarization is p-polarization, or the first polarization is p-polarization and the second polarization is s-polarization.

13. The target detection method of claim 12, further comprising absorbing the first beam at a light absorber.

14. The target detection method of claim 12, wherein:
the detection light and the receiving light pass through a quarter-wave plate in opposite directions;
between receiving the emitted laser beam by the reflector to allow at least the portion of the emitted laser beam to transmit through the reflector and reflecting the detection light by the two-dimensional scanning module to scan across the environment, the method further comprises:
receiving the second beam by the quarter-wave plate as the detection light, and
polarizing the detection light by the quarter-wave plate into circularly polarized light before reaching the two-dimensional scanning module; and
between reflecting the receiving light by the two-dimensional scanning module towards the reflector and reflecting the receiving light by the reflector towards the detector, the method further comprises:
polarizing the receiving light by the quarter-wave plate to have the first polarization, and
reflecting the receiving light from the quarter-wave plate by the polarization beam splitter to the detector.

15. The target detection method of claim 10, wherein the detection light and the receiving light are substantially coaxial.

16. The target detection method of claim 10, wherein:
the two-dimensional scanning module comprises a rotatable first scanning module and a rotatable second scanning module;
the detection light is reflected by the first scanning module and the second scanning module sequentially to scan the environment;
a rotation of the first scanning module causes the detection light to scan in a horizontal direction;
a rotation of the second scanning module causes the detection light to scan in a vertical direction; and
the receiving light is reflected by the second scanning module and the first scanning module sequentially.

17. The target detection method of claim 10, between emitting the laser beam from the laser and receiving the emitted laser beam by the reflector to allow at least the portion of the emitted laser beam to transmit through the reflector, further comprising receiving the laser beam emitted from the laser by a collimator and collimating the laser beam by the collimator to the reflector.

18. A Lidar system, comprising:
a laser configured to emit a laser beam;
a polarization beam splitter configured to receive the emitted laser beam propagating in a first direction and split the emitted laser beam into a first beam and a second beam, wherein the second beam is at least a portion of the emitted laser beam that transmits through the reflector and propagates in the first direction and is detection light;
a two-dimensional scanning module; and a detector, wherein:
> the two-dimensional scanning module is configured to:
>> reflect the detection light to scan across an environment,
>> receive at least a portion of the detection light reflected by a target in the environment, the at least the portion of the detection light reflected by the target being receiving light, and
>> reflect the receiving light towards the polarization beam splitter;
>
> the polarization beam splitter is further configured to reflect the receiving light towards the detector; and
>
> the detector is configured to measure the receiving light to detect the target.

19. The Lidar system of claim 18, wherein:
the polarization beam splitter is configured to receive the emitted laser beam propagating in the first direction and split the emitted laser beam into the first beam having a first polarization and the second beam having a second polarization;
the first beam propagates in a second direction normal to the first direction; and
the first polarization is s-polarization and the second polarization is p-polarization, or the first polarization is p-polarization and the second polarization is s-polarization.

20. The Lidar system of claim 19, further comprising a light absorber configured to absorb the first beam.

* * * * *